United States Patent
Park

(10) Patent No.: US 8,924,011 B2
(45) Date of Patent: Dec. 30, 2014

(54) INTELLIGENT ROBOT APPARATUS RESPONSIVE TO ENVIRONMENTAL CHANGE AND METHOD OF CONTROLLING AND RECONFIGURING INTELLIGENT ROBOT APPARATUS

(75) Inventor: Hong Seong Park, Seoul (KR)

(73) Assignee: Knu-Industry Cooperation Foundation, Gangwon-Do (KR)

( * ) Notice: Subject to any disclaimer, the term of this patent is extended or adjusted under 35 U.S.C. 154(b) by 246 days.

(21) Appl. No.: 13/438,647

(22) Filed: Apr. 3, 2012

(65) Prior Publication Data

US 2013/0261796 A1    Oct. 3, 2013

(51) Int. Cl.
    G06F 19/00    (2011.01)
    G05B 19/04    (2006.01)

(52) U.S. Cl.
    USPC ............ 700/245; 700/248; 700/250; 700/252

(58) Field of Classification Search
    CPC ... G06N 3/008; B62D 57/032; G05D 1/0274; G05D 1/0255; G05D 1/0246
    USPC .................................. 700/245, 248, 250, 252
    See application file for complete search history.

(56) References Cited

U.S. PATENT DOCUMENTS

| | | | |
|---|---|---|---|
| 2001/0020837 A1* | 9/2001 | Yamashita et al. ............ 318/567 |
| 2002/0137425 A1* | 9/2002 | Furumura ..................... 446/175 |
| 2002/0138822 A1* | 9/2002 | Noma .......................... 717/131 |
| 2003/0055653 A1* | 3/2003 | Ishii et al. ..................... 704/275 |
| 2003/0056252 A1* | 3/2003 | Ota et al. ....................... 901/47 |
| 2003/0095514 A1* | 5/2003 | Sabe et al. .................... 370/328 |
| 2003/0097202 A1* | 5/2003 | Fujita et al. .................... 700/245 |
| 2003/0109959 A1* | 6/2003 | Tajima et al. .................. 700/245 |
| 2003/0144764 A1* | 7/2003 | Yokono et al. ................ 700/245 |
| 2004/0230340 A1* | 11/2004 | Fukuchi et al. ............... 700/245 |
| 2005/0054332 A1* | 3/2005 | Sakagami et al. ......... 455/414.1 |
| 2005/0080513 A1* | 4/2005 | Ito ................................ 700/245 |
| 2005/0182516 A1* | 8/2005 | Tsurumi ....................... 700/246 |
| 2005/0194921 A1* | 9/2005 | Tsurumi ................... 318/568.12 |
| 2006/0012493 A1* | 1/2006 | Karlsson et al. ......... 340/995.24 |
| 2006/0195226 A1* | 8/2006 | Matsukawa et al. .......... 700/245 |
| 2007/0208442 A1* | 9/2007 | Perrone .......................... 700/95 |
| 2007/0213872 A1* | 9/2007 | Matsuzaki et al. ............ 700/245 |
| 2008/0141220 A1* | 6/2008 | Kim et al. ..................... 717/120 |
| 2009/0254217 A1* | 10/2009 | Pack et al. ..................... 700/246 |
| 2010/0145509 A1* | 6/2010 | Zhang et al. .................. 700/245 |
| 2010/0161836 A1* | 6/2010 | Song et al. ...................... 710/8 |
| 2010/0206651 A1* | 8/2010 | Nagasaka ..................... 180/218 |
| 2010/0286824 A1* | 11/2010 | Solomon ....................... 700/248 |
| 2010/0286826 A1* | 11/2010 | Tsusaka et al. ................ 700/254 |
| 2010/0286905 A1* | 11/2010 | Goncalves et al. ........... 701/200 |
| 2011/0204209 A1* | 8/2011 | Barrows ..................... 250/208.1 |
| 2012/0059514 A1* | 3/2012 | Suh ................................ 700/245 |
| 2012/0083982 A1* | 4/2012 | Bonefas et al. ................. 701/70 |

(Continued)

*Primary Examiner* — Ian Jen

(74) *Attorney, Agent, or Firm* — Patterson Thuente Pedersen, P.A.

(57) ABSTRACT

Provided is a robot apparatus and a method of reconfiguring a software component and an internal environment that may autonomously optimize and reconfigure a component execution program, execution environment settings, and the like, dynamically reconfigure components using a component included in the robot or a component downloaded from a server, or optimally configure an internal configuration of the robot, in response to the provided command so that the robot apparatus may perform a provided command in response to a change in an environment by dynamically recognizing the change in the environment when an environment in which the robot is used, although the external environment or the internal environment is changed while the robot is operated.

14 Claims, 12 Drawing Sheets

(56) References Cited

U.S. PATENT DOCUMENTS

2012/0088884 A1* 4/2012 Fukushi et al. .............. 525/276
2012/0089410 A1* 4/2012 Mikurak ........................ 705/1.1
2013/0261796 A1* 10/2013 Park .............................. 700/245
2014/0238964 A1* 8/2014 Casner .......................... 219/132

* cited by examiner

INTELLIGENT ROBOT APPARATUS RESPONSIVE TO ENVIRONMENTAL CHANGE AND METHOD OF CONTROLLING AND RECONFIGURING INTELLIGENT ROBOT APPARATUS

BACKGROUND

1. Field of the Invention

The present invention relates to a method of reconfiguring a robot apparatus and a software component that may optimize an internal component of the robot apparatus in response to a changed environment by recognizing a change in an external and internal environment. More particularly, the present invention relates to an apparatus for optimizing components and a method of reconfiguring a configuration of a robot apparatus or a component using optimized environment settings, a software component included in the robot apparatus, or a software component downloaded from an external server.

Also, the present invention relates to a robot apparatus and a method of controlling the robot apparatus to adapt to various commands input by a user to the robot apparatus. More particularly, the present invention relates to a robot apparatus and a method of controlling the robot apparatus that may optimize an internal component or a configuration of a software component in response to a command of a user, that is, the robot apparatus and a method of controlling the robot apparatus that may process the command optimally by changing the internal component of the robot apparatus to be optimum, from a current component of the robot apparatus to an optimal component, in response to various commands input by the user, based on an environment in which the robot apparatus may be operated.

2. Description of the Related Art

When compared to a conventional industrial robot, an intelligent robot needs to actively perform various functions, for example, moving, sensing, processing, and the like, to provide a user with more various services. When the sensing function is supplemented in the intelligent robot, the intelligent robot may behave more actively based on an accurate recognition of a situation, and constraints on processing may be removed. Accordingly, a function of the robot may be broadened to perform various services, whereby intelligence of the robot may be improved.

Accordingly, the intelligent robot may include various sensors and imaging devices to recognize an object, a human, or a location of the robot, and may include a number of actuators to take an action suitable for a particular situation. The intelligent robot may have a system configuration in which the various sensors, actuators, and imaging devices are physically distributed, and may include at least one input and output board and at least one processor board. As aforementioned, the intelligent robot may actively perform various services. For example, when the sensing function is supplemented, the intelligent robot may behave move actively based on an accurate recognition of a situation.

Since the intelligent robot is used in various fields, various types of robots are being developed.

Since it may be inefficient to manufacture different robots depending on environments that the robots are to be used in, research is being conducted on a method that may provide a robot having various actuator, sensing, and processing functions, and may optimize the actuator, sensing, and processing functions. However, such a method has yet to be developed sufficiently, to date.

As an example, according to a conventional art, when an indoor robot is to be used outdoors, a robot manufactured to be used indoors may not be used outdoors since an internal environment and an external environment are vastly different from each other. Problems lie in that, in order to use the indoor robot outdoors, a separate robot optimized to the external environment should be manufactured, internal components of the indoor robot should be replaced so as to adapt to the external environment, and a user should set resultant environmental variables and application programs separately.

As another example, a robot that is used in an identical environment may not be operated normally due to a fault occurring in a component constituting the robot, for example, a driving device, for example, a motor, or a sensor, for example, a laser sensor, an ultrasonic sensor, and the like. In this instance, the robot may need to deactivate the component in which the fault occurs, and to perform a provided command only using other operable components.

However, in the conventional art, when a fault occurs, the robot may report such a fault to a user or an administrator. The user or the administrator may suspend operation of the robot to fix the fault, and may resume operation of the robot. In this instance, a problem exists in that the operation of the robot may be suspended until the fault is fixed.

Similarly, when a fault occurs in a sensor, which is one of several components in the robot, the operation of the robot may be suspended until the fault is fixed, in the same manner.

Accordingly, there is a need for a method that may optimally perform a command without suspending operation of a robot, by reconfiguring components using operable components, excluding components in which a fault occurs although an environment of the components in the robot, that is, an internal environment of the robot, is dynamically changed by the fault occurring in the components in the robot.

In addition, with application of a robot to various fields, a method of applying a robot having a uniform platform in various application fields is being studied. As an example, research is being conducted on a robot having a single platform may assist in cleaning, assist in various tasks, and assist in education of children. However, the research has yet to yield any results. In reality, actuators and sensing portions used in the aforementioned robots are similar to each other According to current development circumstances, components to be included in a robot may need to be reset or reconfigured in order to have a plurality of functions performed in different environments via a single platform. In the process of resetting or reconfiguring the components, a configuration of components of a robot, setting variables of the components, or the like may need to be optimized so that the robot may adapt to a new environment. Accordingly, the robot may be taken back to a location where experts having professional technical expertise, for example, robot manufacturers, and the like, are situated, and may be reset or reconfigured before being returned to a user. The foregoing process may present a serious inconvenience to the user. Also, since the robot may be optimized to an environment predetermined by the robot manufacture, as opposed to an environment in which the robot is actually used, a problem also lies in that the robot may fails to be optimized to the environment in which the robot is actually used. Also, problems lie in that the robot may not be used in various environments in real time, and different robots may be needed in different environments.

SUMMARY

An aspect of the present invention provides a robot apparatus and a method of reconfiguring an internal environment that may autonomously optimize and reconfigure a component execution program, execution environment settings, and the like so that the robot apparatus may perform a provided command in response to a change in an environment by dynamically recognizing the change in the environment when an environment in which the robot is used, that is, an external environment in which the robot may be installed or operated, or an internal environment, that is, a component in the robot, is changed, in particular, although the external environment or the internal environment is changed while the robot is being operated.

Another aspect of the present invention also provides an apparatus and method of dynamically reconfiguring a robot software component that may dynamically reconfigure a software component included in a robot or a software component downloaded from an external server so that the robot may autonomously perform a response and a motion suitable for a change in an external or internal environment and situational conditions that may be changed by a movement of the robot, an internal fault, and the like.

Still another aspect of the present invention also provides a command-adaptive intelligent robot apparatus and a method of controlling the robot apparatus that may enable the robot apparatus to perform an execute command, by analyzing the execute command input into the robot apparatus, predicting a component to be operated among components included in the robot apparatus, deriving an optimal configuration of the component so that the input execute command may be performed optimally, and resetting the component of the robot apparatus when a component setting file or a component execution program used for executing the component is currently applicable to the robot apparatus.

Yet another aspect of the present invention also provides a command-adaptive intelligent robot apparatus and a method of controlling the robot apparatus that may analyze an execute command that is input into the robot apparatus, and may determine whether a component setting file or a component execution program used for resetting a component included in the robot apparatus is currently applicable to the robot apparatus.

Further another aspect of the present invention also provides a command-adaptive intelligent robot apparatus and a method of controlling the robot apparatus that may reset a component of a robot apparatus by receiving a component setting file or a component execution program used to reset the component included in the robot apparatus when the component setting file or the component execution program is verified to be present in a server, in a case in which the component setting file or the component execution file is determined to be currently inapplicable to the robot apparatus, based on a result of analyzing an execute command that is input into the robot apparatus.

Still another aspect of the present invention also provides a command-adaptive intelligent robot apparatus and a method of controlling the robot apparatus that may transmit, from the robot apparatus to a server, input execute command information, state information of the robot apparatus, and environmental information that may be generated when a command is executed, transmit, from the server to the robot apparatus a process command with respect to a component of the robot apparatus that is used to perform an execute command, after the server processes the information received from the robot apparatus, and may execute the component based on the received process command in the robot apparatus when a component setting file or a component execution program used to reset the component included in the robot apparatus is verified to be absent in a server, in a case in which the component setting file or the component execution file is determined to be currently inapplicable to the robot apparatus, based on a result of analyzing an execute command that is input into the robot apparatus.

According to an aspect of the present invention, there is provided a method of dynamically reconfiguring an internal environment of a robot apparatus, the method including dynamically recognizing a change in an environment, determining an internal component to be changed in the robot apparatus, based on the change in the environment recognized, and verifying whether a component setting file and a component execution program optimally corresponding to the internal component to be changed are present in the robot apparatus.

The method may further include converting the change in the environment recognized to a parameter.

The determining may include determining the internal component to be changed in the robot apparatus, based on the parameter.

The method may further include optimizing the internal component using a component setting file and a component execution program optimally corresponding to the internal component to be changed when the component setting file and the component execution program optimally corresponding to the internal component to be changed are present in the robot apparatus.

The method may further include operating the robot apparatus in a changed environment.

The changed environment may correspond to an external environment of the robot apparatus or an internal environment of the robot apparatus.

A parameter with respect to a change in the external environment of the robot apparatus may correspond to a value indicating a number of objects moving around the robot apparatus, or a value indicating a number of obstacles on a moving route of the robot apparatus.

A parameter with respect to a change in the internal environment of the robot apparatus may correspond to a value indicating whether a software component or a hardware component included in the robot apparatus is normally operated, or a value indicating whether an available capacity of a battery is maintained at a predetermined level.

The change in the external environment may be recognized based on a change in a value measured by at least one sensor included in the robot apparatus.

The internal component to be changed may include at least one of a software component or a hardware component included in the robot apparatus, and the software component may include a component setting file and an execution program for the hardware component that is executed by the software component.

The method may further include requesting, from a server, a component setting file or a component execution program, when the component setting file and the component execution program optimally corresponding to the internal component to be changed are absent in the robot apparatus, and transmitting, by the server, the requested component setting file or the requested component execution program to the robot apparatus, when the requested component setting file and the requested component execution program are present in the server.

When the requested component setting file and the requested component execution program are absent in the server, information indicating that the requested component setting file and the requested component execution program are absent in the server may be reported to the robot apparatus. In this case, the method may further include transmitting, by the robot apparatus, a current state and an execute command to the server, generating, by the server, a process command based on the received current state of the robot apparatus, and the execute command, and transmitting the generated process command to the robot apparatus, and receiving, by the robot apparatus, the process command, and processing the execute command in a changed environment.

The method may further include storing, in a storage unit included in the robot apparatus, the component setting file and the component execution program transmitted from the server, or the process command transmitted from the server. When a greater number of process commands than a predetermined number are transmitted from the server, the method may further include generating a combination of the process commands as the component setting file and the component execution program optimally corresponding to the internal component to be changed, and storing the combination of the process commands.

The process commands transmitted from the server may correspond to modules constituting the component setting file and the component execution program optimally corresponding to the internal component to be changed.

According to another aspect of the present invention, there is also provided a method of dynamically reconfiguring a software component in a robot, the method including dynamically detecting a change in an environment, and extracting information about the change in the environment to reconfigure the software component included in the robot, based on the change in the environment detected.

The method may further include generating a reconfiguration plan for a software component corresponding to the change in the environment, based on the extracted information.

The reconfiguration plan may be generated based on an execution plan for a hardware component included in the robot.

The method may further include reconfiguring the software component of the robot based on the generated reconfiguration plan for the software component, and operating the robot by reconfiguring a hardware component based on the reconfigured software component.

Information used for the reconfiguration plan for the software component may include at least one of a location of the robot, a number of objects moving around the robot, a number of obstacles on a route the robot apparatus moves on, temperature, humidity, and brightness.

According to still another aspect of the present invention, there is also provided a method of controlling a command-adaptive intelligent robot apparatus, the method including receiving an execute command, analyzing an expected motion of the robot apparatus based on the execute command, and determining, based on the expected motion of the robot apparatus, a component setting file or a component execution program, to be used for optimally executing a component included in the robot apparatus.

The method may further include determining whether the determined component setting file or the determined component execution program is currently applicable to a target component of the robot apparatus.

A criterion for determining whether the determined component setting file or the determined component execution program is currently applicable to the target component of the robot apparatus may be determined based on at least one of a program format, a central processing unit (CPU) type, and an operating system (OS) included in the determined component setting file or the determined component execution program.

The method may further include requesting, from a server, another component setting file or another component execution program, when the determined component setting file or the determined component execution program is currently inapplicable to the target component of the robot apparatus, and transmitting, by the server, the requested setting file or the requested component execution program to the robot apparatus, when the requested component setting file and the requested component execution program are present in the server.

The method may further include transmitting to the server, by the robot apparatus, input execute command information, state information, and environmental information of the robot apparatus, generated when the robot apparatus performs the execute command, generating, by the server, a process command based on the received input execute command information, state information, and environmental information of the robot apparatus, and transmitting the generated process command to the robot apparatus, and receiving, by the robot apparatus, the process command, and processing the execute command by executing a component of the robot apparatus. In this instance, when the requested component setting file and the requested component execution program are absent in the server, information indicating that the requested component setting file and the requested component execution program are absent in the server may be reported to the robot apparatus.

The server may correspond to a proximity computing system that may enable a shortest communication.

The method may further include storing in a storage unit included in the robot apparatus, the component setting file and the component execution program or the process commands transmitted from the server.

The process commands transmitted from the server may correspond to modules constituting the component setting file and the component execution program. When a greater number of process commands than a predetermined number are transmitted from the server, the method may further include generating a combination of the process commands as the determined component setting file and the determined component execution program, and storing the combination of the process commands.

Effect of the Invention

The embodiments of the present invention may include a robot apparatus and a method of reconfiguring an internal environment that may autonomously optimize and reconfigure a component setting file, a component execution program, or the like so that the robot apparatus may perform a provided command in response to a change in an environment, by dynamically recognizing the change in the environment when an external environment of the robot apparatus in which the robot apparatus is used or installed is changed or an internal environment of the robot apparatus is changed due to a fault occurring in an internal component of the robot apparatus, in particular, when the external environment or the internal environment is changed while the robot apparatus is operated.

The embodiments of the present invention may include an apparatus and method of dynamically reconfiguring a software component in a robot apparatus that may dynamically reconfigure a software component included in the robot apparatus or a software component downloaded from an external server so that the robot apparatus may autonomously perform a response and a motion suitable for a change in external or internal environment and situational conditions that may be changed by a movement of the robot, an internal fault, and the like.

The embodiments of the present invention may include a command-adaptive intelligent robot apparatus and a method of controlling the robot apparatus that may enable the robot apparatus to perform an input execute command, by analyzing the execute command input into the robot apparatus, predicting a component to be operated among components included in the robot apparatus, deriving an optimal configuration of the component to be operated so that the input execute command may be performed optimally, and resetting the component of the robot apparatus when a component setting file or a component execution program used for executing the component is currently applicable to the robot apparatus. When the component setting file or the component execution program is inapplicable to the robot apparatus, the apparatus and method may verify whether a component setting file or a component execution program is present in a server. When the component setting file or the component execution program is present in the server, the apparatus and method may reset components of the robot apparatus by receiving the corresponding setting file or the component execution program from the server. Conversely, when the component setting file or the component execution program is absent in the server, the robot apparatus may transmit, to the server, input execute command information, state information, and environmental information of the robot apparatus, generated when the robot apparatus performs the command. The server may transmit a process command with respect to the component of the robot apparatus, which may be used to perform the execute command, by processing the input execute command information, the state information, and the environmental information of the robot apparatus. The robot apparatus may receive the process command, and may execute the component based on the received process command.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
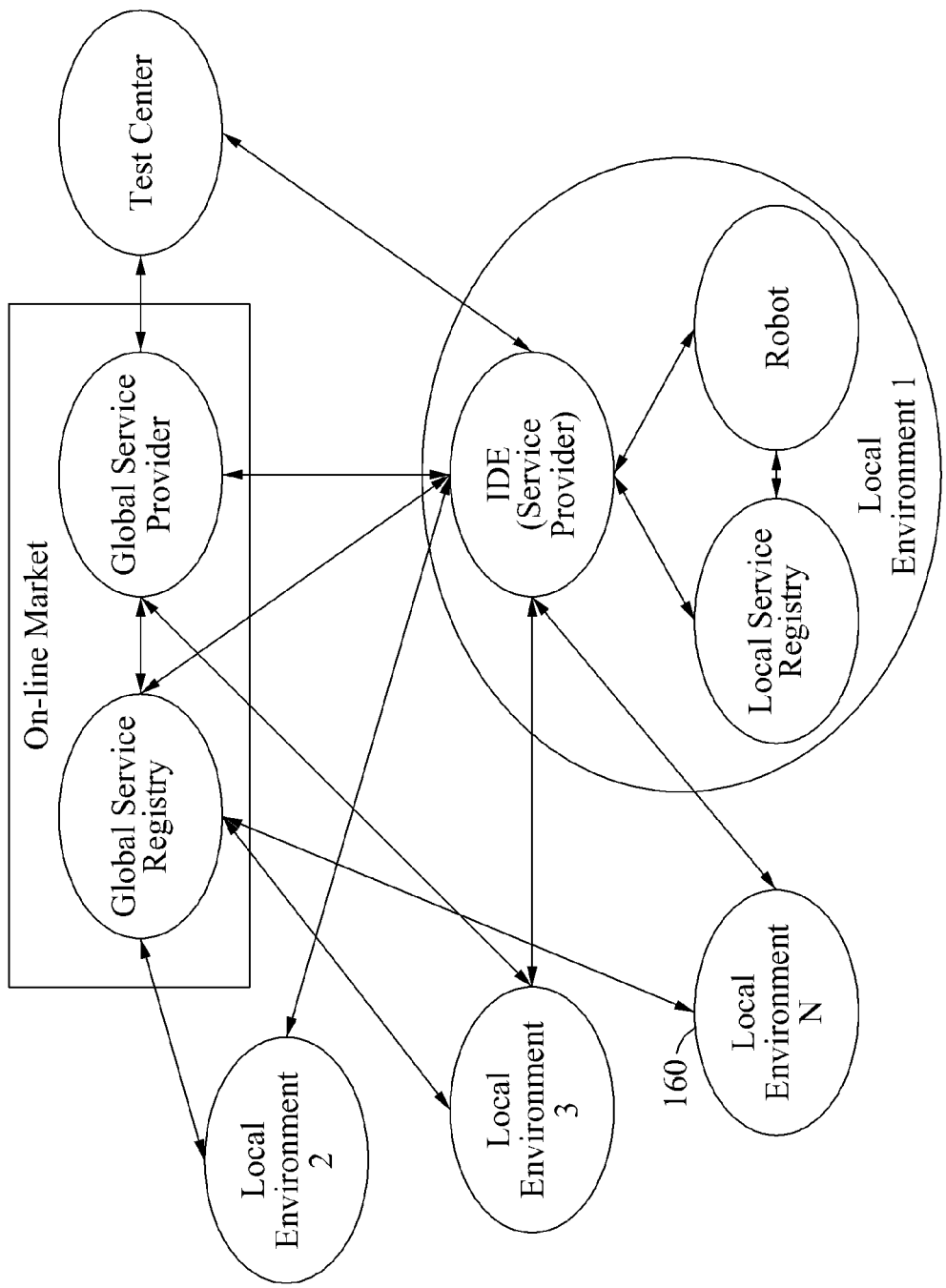
FIG. 1 is a diagram illustrating a configuration of an intelligent robot system according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

FIG. 1 is a diagram illustrating a configuration of an intelligent robot system according to an embodiment of the present invention.

Referring to FIG. 1, it can be understood that recent robot systems are designed to be open systems. That is, since a standardized terminal apparatus, content technologies such as Hypertext Mark-up Language (HTML) and Hypertext Transfer Protocol (HTTP), and a transmission standard are provided, anyone may easily prepare contents for a robot to provide to a server of a robot system, and the provided contents may be distributed to a user by a service provider.

Accordingly, various service providers and robots may be interconnected with each other, expenses used for development of services and robots may be minimized, and structural standards for external software interworking with robots and a robot software technology for optimizing, hierarchizeing, and modularizing conventional software technologies to be suitable for the robots may be defined.

Contents developed in the open system may be approved through an examination of a test center on whether the developed contents are suitable for robot apparatuses currently being used, or the developed contents satisfy requirements, for example, safety requirements, and the like, and then may be distributed in each local environment via a network.

Each local environment may include a robot apparatus, a local service registry, and a local service provider interconnected with the robot apparatus to manage contents, and the like by communicating with an on-line market.

The local service provider may provide a local integrate development environment (IDE) which refers to an environment in which a user may develop robot contents directly, as necessary. Contents developed in the local IDE may be stored in the local service registry.

The contents developed in the local IDE may be provided to the on-line market, as necessary, and the provided contents may be stored in a global service registry. Other users may be provided with the stored contents from a global service provider by searching for the contents.

As aforementioned, the contents developed by the local user and transmitted from the local service provider may be stored formally in the global service registry only when the contents pass the examination of the test center with respect to evaluation items.

A server in the intelligent robot system may be operated in a centralized manner, and may be operated in a form of clouding computing, that is, as a cloud server including a plurality of local service providers and local service registries.

Figure 2:
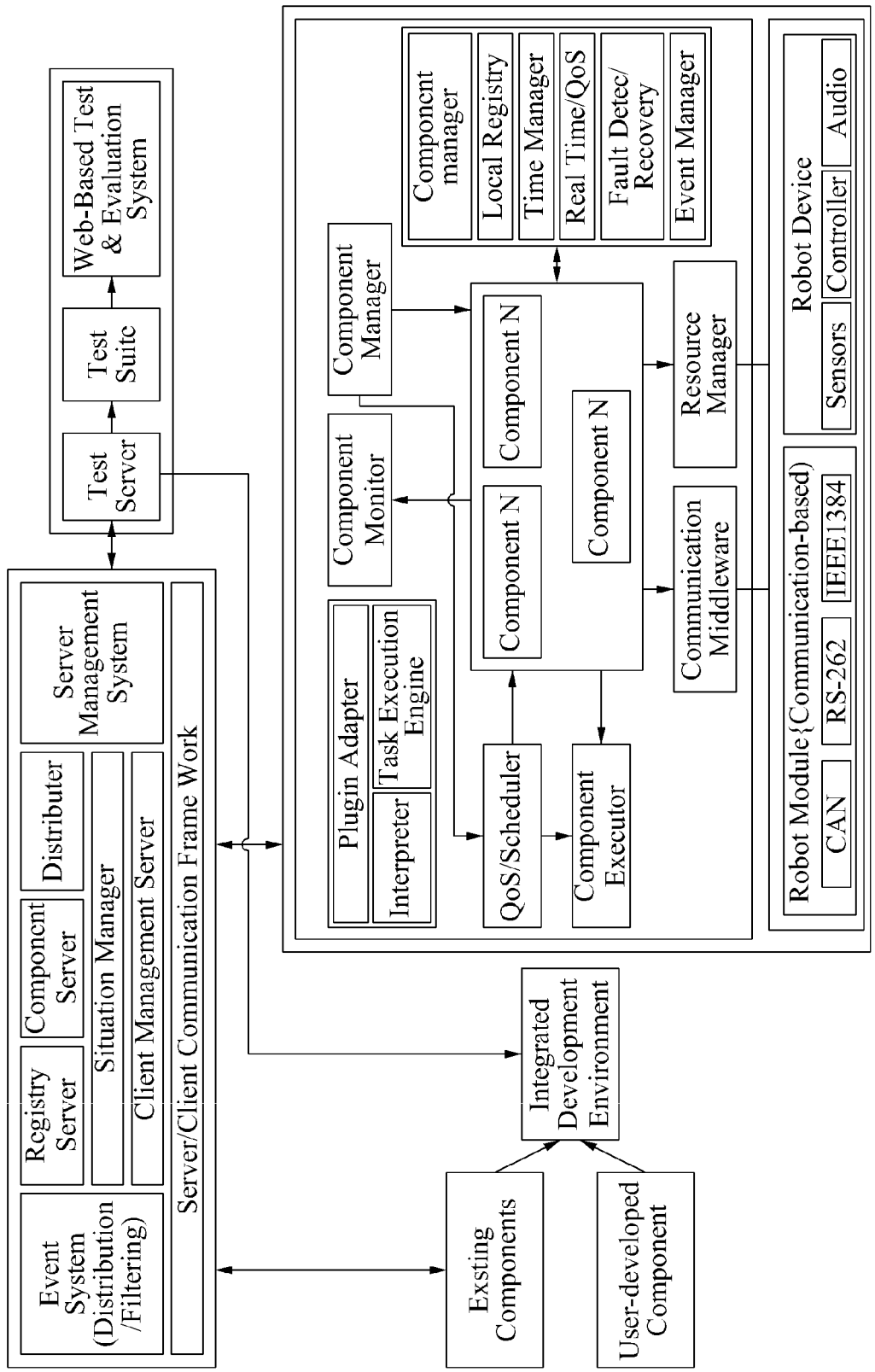
FIG. 2 is a diagram illustrating a flow of data between components of an intelligent robot system according to an embodiment of the present invention.

FIG. 2 is a diagram illustrating a flow of data between components of an intelligent robot system according to an embodiment of the present invention.

As described with reference to FIG. 1, the intelligent robot system may correspond to an open system in which existing contents and contents to be newly developed may be available simultaneously.

A component execution engine may verify whether components corresponding to a resource of an application are present, and upload, to a memory, a portion the components to be periodically executed, and connect a port for data transmission between the components. The component execution engine may include an executor to execute the components periodically, as specified in profiles of the components. Also, the component execution engine may be operated through middleware to interwork with other managers in a framework.

A component/content server may include a global registry, that is, a registry used to share components. When a resource of a robot is insufficient, or when an application or a component to process a task is absent in the robot, the component may be directly executed in the component/content server, and a corresponding result may be transferred to the robot to process the task.

To realize the foregoing, a robot client may report, to a server, information about the robot client, that is, a profile, in advance. Here, an operation of the reporting may be referred to as profiling. The component/content server may manage robot clients by identifying various types of robot clients, using profile information registered by the robot clients, and obtaining interfaces used to obtain and execute events of a predetermined robot client, and interface information required to monitor the interfaces.

A profile of a robot client may be expanded in the component/content server, and the expansion of the profile may indicate an expansion of a function of the robot client. Since an application or contents executed in the robot client may depend on functional limitations of the robot client, types of performable applications and contents may increase as functions of the robot client are diversified. The functional limitations of the robot client may be overcome to a predetermined extent through the component/content server. As an example, when components such as a speaker, a microphone, a camera, and the like are included in a single robot client, although a component to enable voice synthesis/recognition and face recognition is absent among components included in the single robot client, the robot client may obtain information using the components such as the speaker, the microphone, the camera, and the like, and may transmit the obtained information to the component/content server. The component/content server may transmit existing profile information to the robot client by readjusting the components of the robot client so that voice synthesis/recognition and facial recognition may be possible. The robot may readjust the components based on the profile information received from the component/content server, thereby enabling voice synthesis/recognition and facial recognition.

More various applications may be prepared using the expanded functions when an application of the robot client is prepared by receiving an expanded profile from the component/content server. The profile may be expanded to more varied functions, rather than a single function, for example, voice synthesis. Accordingly, a robot client having a simple function may be changed to a robot client that may be applied to various and complex fields.

Services provided to the robot client may include contents services, for example, voice recognition/synthesis, image recognition/synthesis, or weather/news, situation recognition service which may be difficult to be performed independently in the robot client, object recognition, and the like.

Application program interfaces (APIs) of a remote application service may be realized using a server/client platform, and a server service agent (SSA) generated by packaging the APIs may be included in the component/content server so that the component/content server may provide a remote callable application to the robot client.

Also, the robot client may include a proxy component for the SSA to use the SSA like an internal component of the robot client.

For a proper operation of an application in a robot client, the component/content server may provide a life cycle management function including initiation, suspension, termination, installation, deletion of the remote call application, and the like. Also, the component/content server may provide an automatic session extinction function for the application to prevent an exhaustion of resources resulting from a fault occurring in the robot client.

An event processing unit may receive an input of events from the robot client or sensors included in various physical spaces, and may transfer the events to a situation manager or an application manager, by filtering or combining the received events. The events may include, for example, voice information, image information, temperature/humidity information, schedule information, and the like. Since event information generated from the robot client may be input through a communication platform, the robot client may include a proxy component for the event processing unit.

The situation manager may maintain and manage pieces of situation information about a position, a user, a robot client, and a service, using data input from the event processing unit. Since a behavior of the robot client may be continuously changed depending on changes in a situation, a function to sense changes in situation information may be provided for a remote robot application. Also, a personalized service using user information may be provided. For example, when a remote robot application is to be performed at home with respect to temperature adjustment and provision of information contents, a temperature and contents preferred by a user may be obtained from user information, whereby an intelligent active service may be provided.

The application manager may execute, manage, and control remote robot applications that are executed in the component/content server. The application manager may manage a state of a remote robot application that is currently being executed, an owner of each remote robot application, a life cycle of a remote robot application, and the like. Also, the application manager may act as an adjuster to adjust an order of execution of remote robot applications which collide with each other or affect each other. A user may newly execute a predetermined robot application through the application manager, and may terminate a robot application currently being executed.

A communication manager, also referred to as communication middleware, may support a connection between middleware of a robot and an outside of the robot, that is, a resource of the component/content server, and may support a connection between the middleware of the robot and a development environment.

In particular, the communication manager may initialize and manage a communication between a robot framework and a server, and a communication between the robot framework and a development environment, for example, an IDE, a monitoring program, and the like, and may provide an environment in which other general managers in the robot framework including a component manager may access the resource of the global registry of the component/content server.

When an execution engine used to control an execution of an entire task requests the component manager to load a component used for the execution of the task, the component manager may configure basic settings between components. In this instance, the component manager may load the component or may unload the component.

A component and contents may be developed or reused through an IDE, and a generated component and contents may be stored in the server or may be downloaded to the robot in order to operate the robot.

A test server may use a test suite to evaluate safety, reliability, and performance of the developed component, and may be requested to perform an evaluation of a component by a robot or an IDE through a web.

Figure 3:
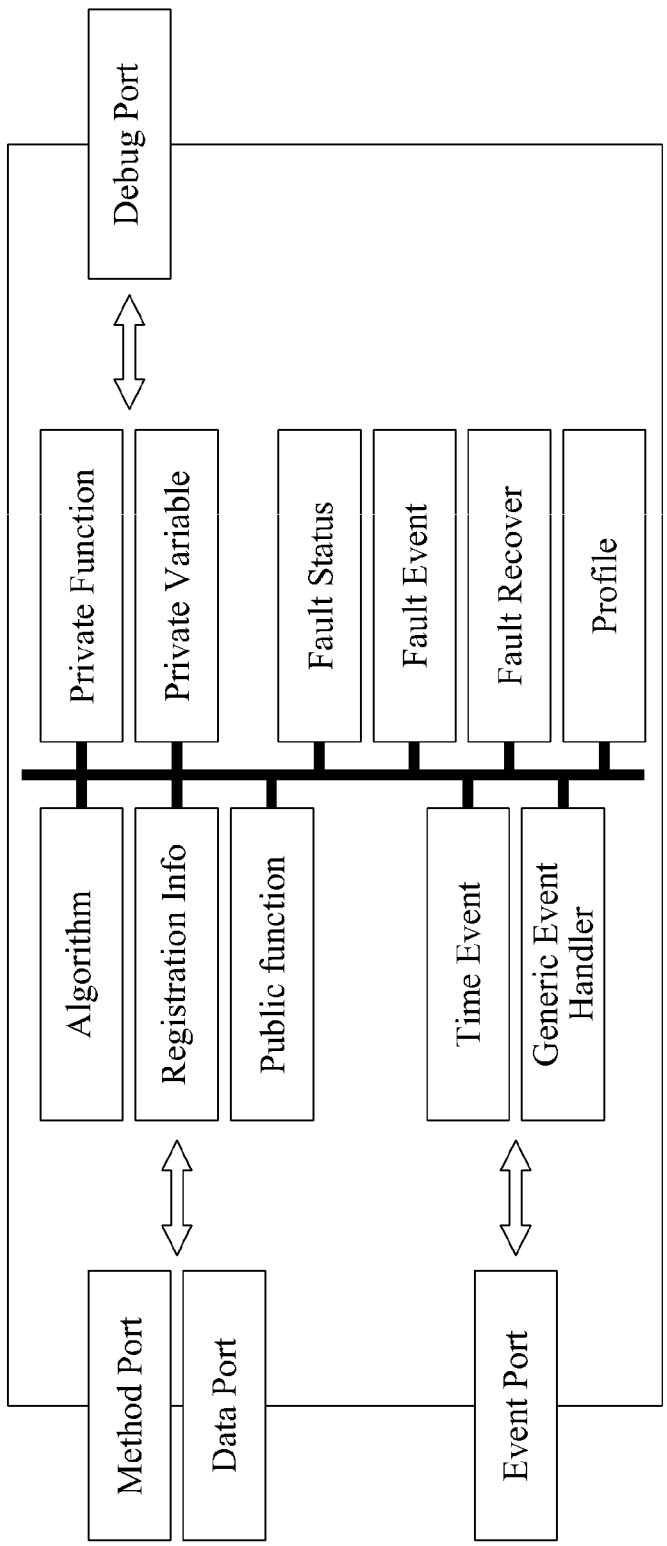
FIG. 3 is a diagram illustrating a model of a component of an intelligent robot system according to an embodiment of the present invention.

FIG. 3 is a diagram illustrating a model of a component of an intelligent robot system according to an embodiment of the present invention.

A component in an intelligent robot system may refer to a component as software, like a part of a machine, and a software module or a hardware module designed for easy reuse and exchange. A component designed for easy reuse and exchange may correspond to a hardware part of a minimum unit or may correspond to hardware of a relatively great unit, like a body of a robot. Also, the component designed for easy reuse and exchange may correspond to a function constituting a program, or the program.

In particular, a unit component connected to a hardware device may correspond to a motor or an ultrasonic sensor, and a composite component including various types of hardware may correspond to an arm or a leg of a robot.

A software component to execute an algorithm may correspond to an algorithm to search for a shortest path. A component having a function may correspond to a monitoring function. A component to perform a task may correspond to a greeting. However, examples of components may not be limited to the foregoing, and there may be more various types of components that may be classified based on properties of the components.

A component in an intelligent robot apparatus may be classified into multiple states based on a state of the component, for example, a generation state, a preparation state, an active state, an inactive state, an error state, a destruction state, a reset state, and the like. The component may have various ports based on a characteristic of data. For example, the component may include a service port, a data port, and an event port that are utilized while the component is executed, and a debug port that is utilized for debugging.

Figure 4:
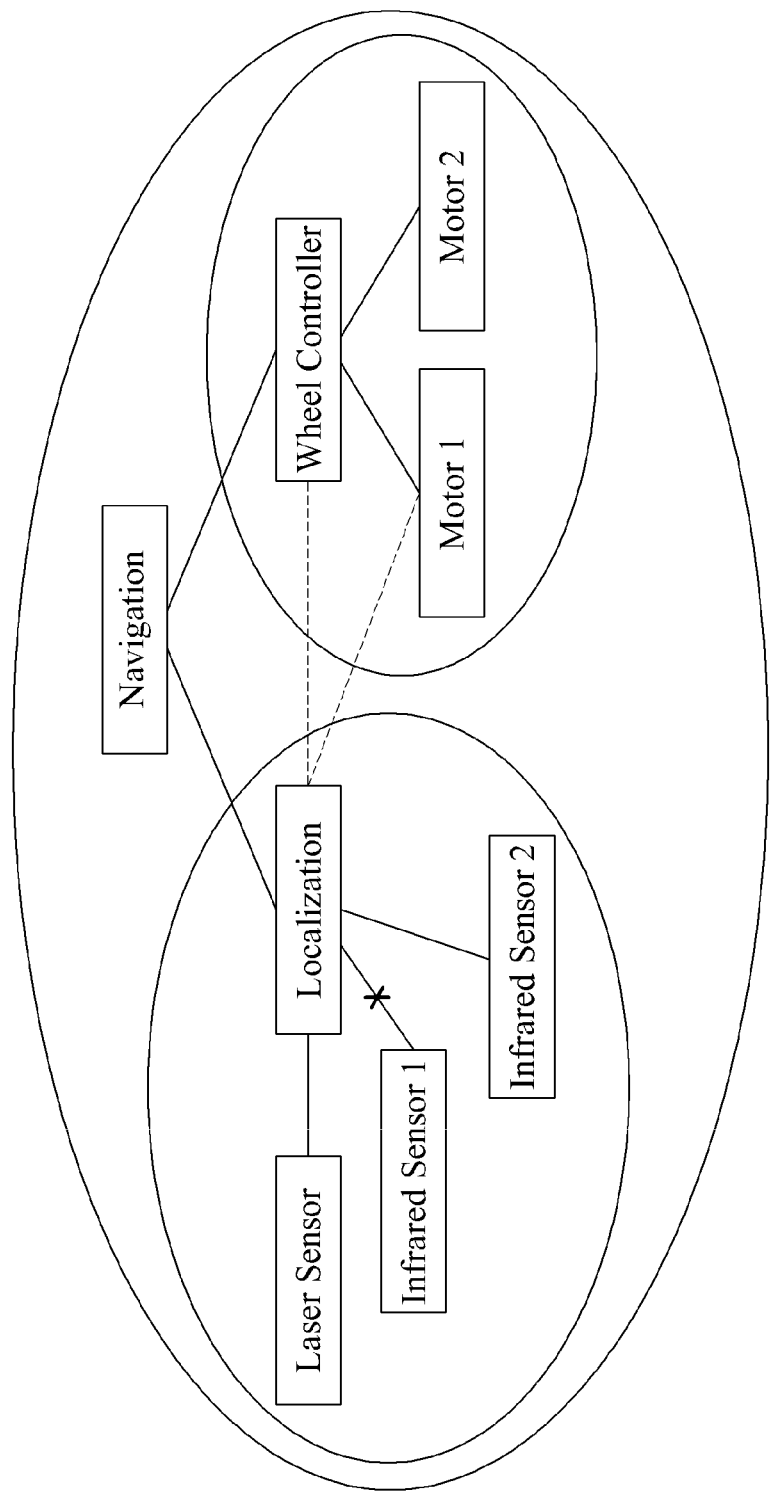
FIG. 4 is a diagram illustrating a configuration of a composite component constituting a robot apparatus according to an embodiment of the present invention.

FIG. 4 is a diagram illustrating a configuration of a composite component constituting a robot apparatus according to an embodiment of the present invention.

FIG. 4 illustrates a configuration of a component to configure a component to perform a navigation task by the component of FIG. 3.

A hardware component may include a laser sensor to detect obstacles on a moving path, and the like, an infrared sensor, a wheel controller, and a motor component. An algorithm, that is, a software component may include an overall map component to control overall map information about fixed obstacles, an obstacle avoiding algorithm component to determine how to avoid the obstacles, a localization component to estimate a location of a robot using the laser sensor, the infrared sensor, or a particle filter, a path planning component to generate a path by verifying a current location and a destination, and the like.

Data and the like may be exchanged between components. For example, data generated by the overall map component may be used in the path planning component and the localization component. The localization component may use data generated by the overall map component and a component of the laser sensor, and the obstacle avoidance algorithm component may make plans to avoid obstacles by executing an obstacle avoiding algorithm using data generated by the laser sensor.

A navigation component may be generated, by the aforementioned components, to be a new component to process movement of a robot.

It may be assumed that an internal environment in components of the robot may be changed.

When a task or command that is initially input to a robot is changed in a process or when a hardware component is inoperable due to an error, components in the robot may be reconfigured based on the changed task or command. For example, when a provided task or command is changed, the localization component may need to transmit data, for example, a control command, and the like, directly to the wheel controller or the motor component according to circumstances. When one of a plurality of sensor components is inoperable due to an error, the localization component may reconfigure the components to process the provided task or command using operable sensor components.

Reconfiguration of the internal components of the robot when the internal environment is changed will be further described later and thus, detailed descriptions will be omitted here, for conciseness.

Figure 5:
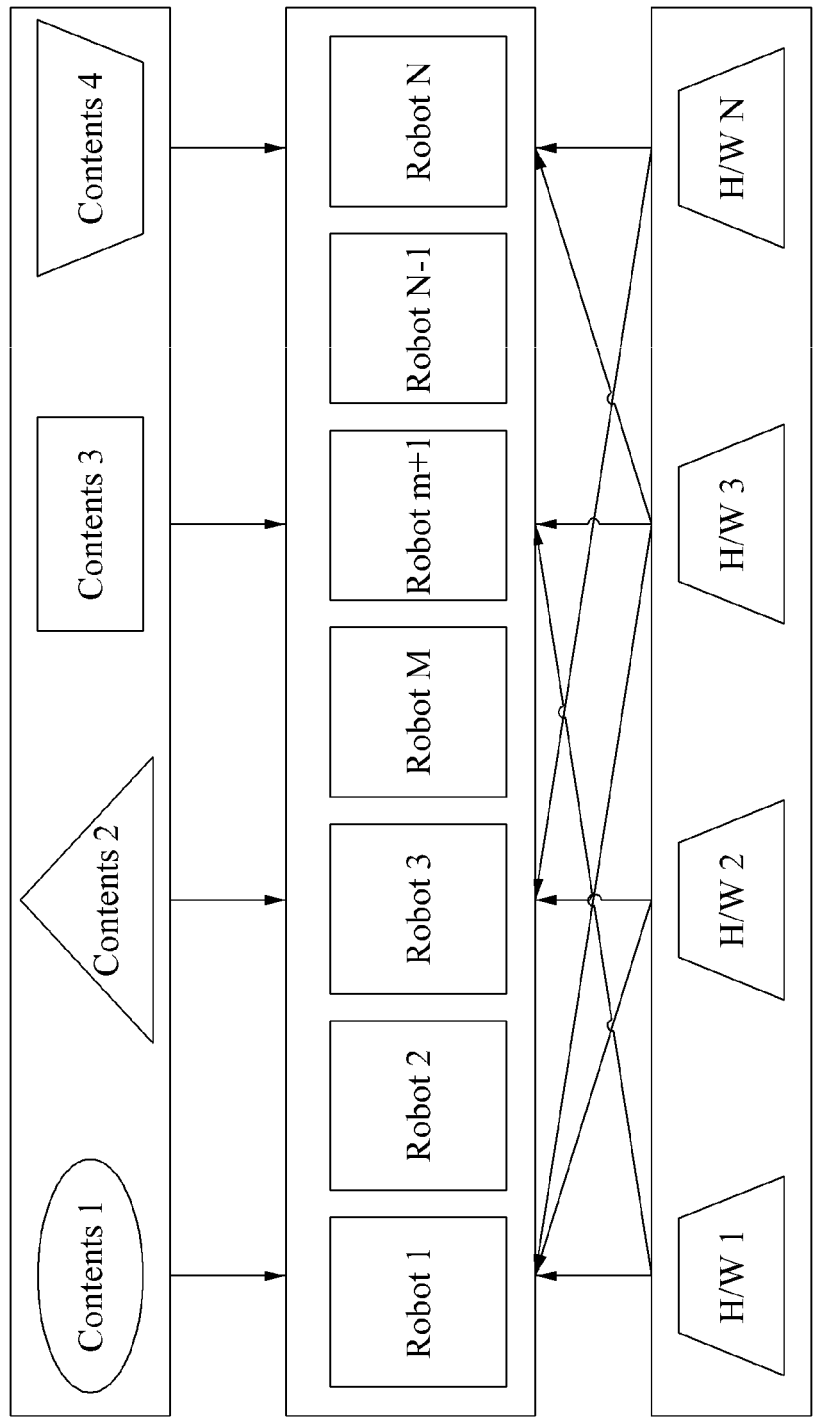
FIG. 5 is a diagram illustrating an application content development model for a robot system according to a conventional art.

FIG. 5 is a diagram illustrating an application content development model for a robot system according to a conventional art.

In an application content development for a conventional robot system, each content may be designed suitably for an individual robot, and may be inapplicable to various robots. Also, a hardware component designed suitably for each robot may be executed.

That is, as shown in FIG. 5, Contents 1 may be designed to be optimized to Robot 1 using Hardware component 1, Hardware component 2, and Hardware component 3. Similarly, Contents 2 may be designed to be optimized to Robot 3 using Hardware component 1 and Hardware component 4.

However, Contents 1 may be inapplicable to other robots. In order to execute an application executed by Contents 1 in the other robots, Contents 1 should be redesigned in view of hardware components, and the like included in the other robots.

Figure 6:
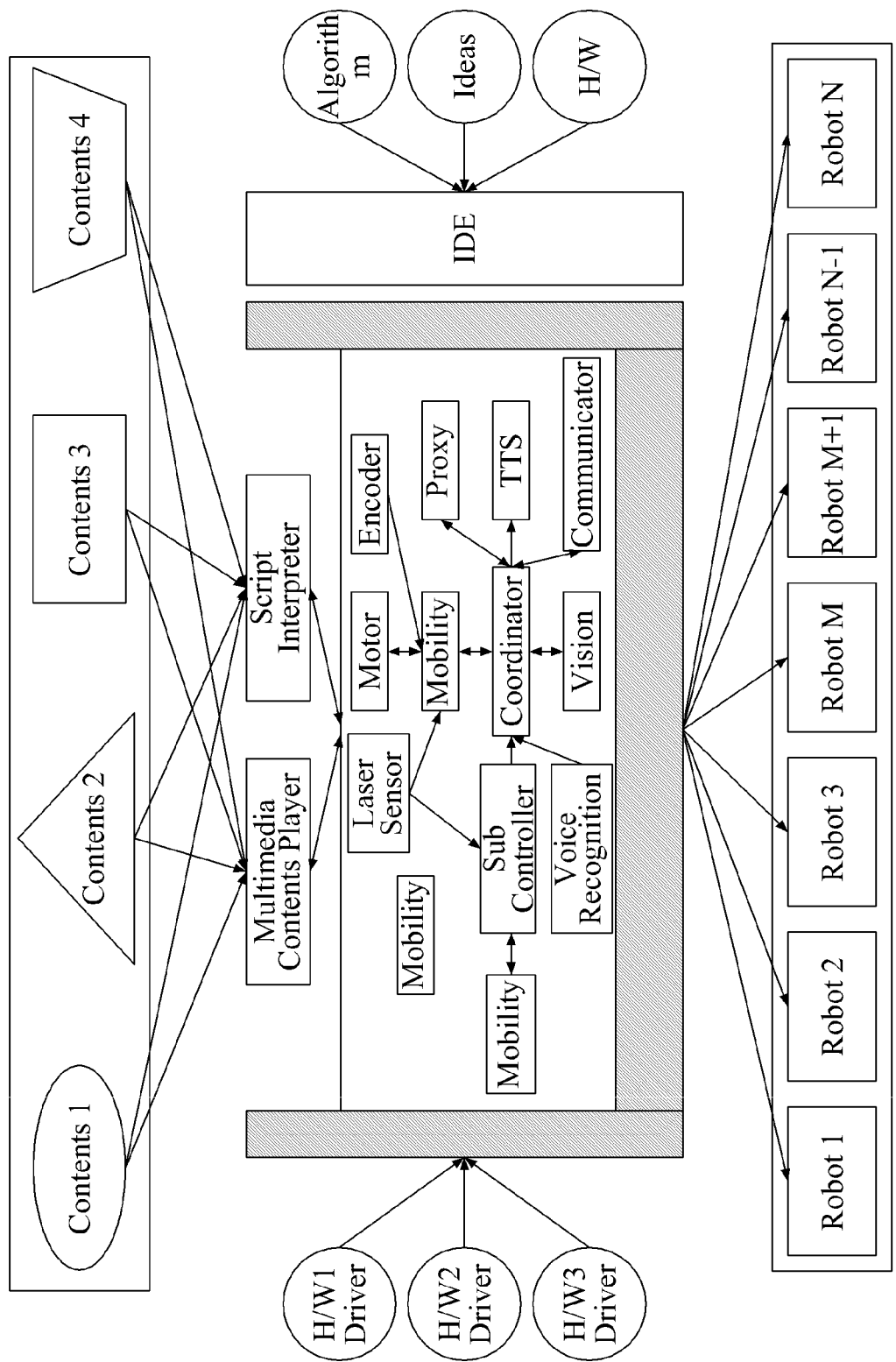
FIG. 6 is a diagram illustrating a content and component acceptance development model for a robot apparatus according to an embodiment of the present invention.

FIG. 6 is a diagram illustrating a content and component acceptance development model for a robot apparatus according to an embodiment of the present invention.

According to embodiments of the present invention, a robot system may selectively receive and combine application contents or software components that are developed by a predetermined user. In order to execute a plurality of application contents or software components, the robot system may include a multimedia contents player and a script interpreter to interpret contents of the application contents or software components.

The application contents and software components may be developed in advance and stored in a server, and may be developed by a user through an IDE.

Hardware components to execute the application contents or software components may be selected based on contents interpreted by the multimedia contents player and the script interpreter, and execution programs, setting environment, and the like may be selected to execute the hardware components.

In this instance, components, for example, a laser sensor, a mobility, a vision, and the like, may be selected and combined to execute a navigation application content or software component. The navigation application content or software component may be executed irrespective of whether the components, for example, the laser sensor, the mobility, the vision, and the like, are included in a robot.

That is, as described with reference to FIG. 2, when corresponding components are absent in a robot, desired application contents and software components may be executed using components included in the robot and a resource of a server.

Figure 7:
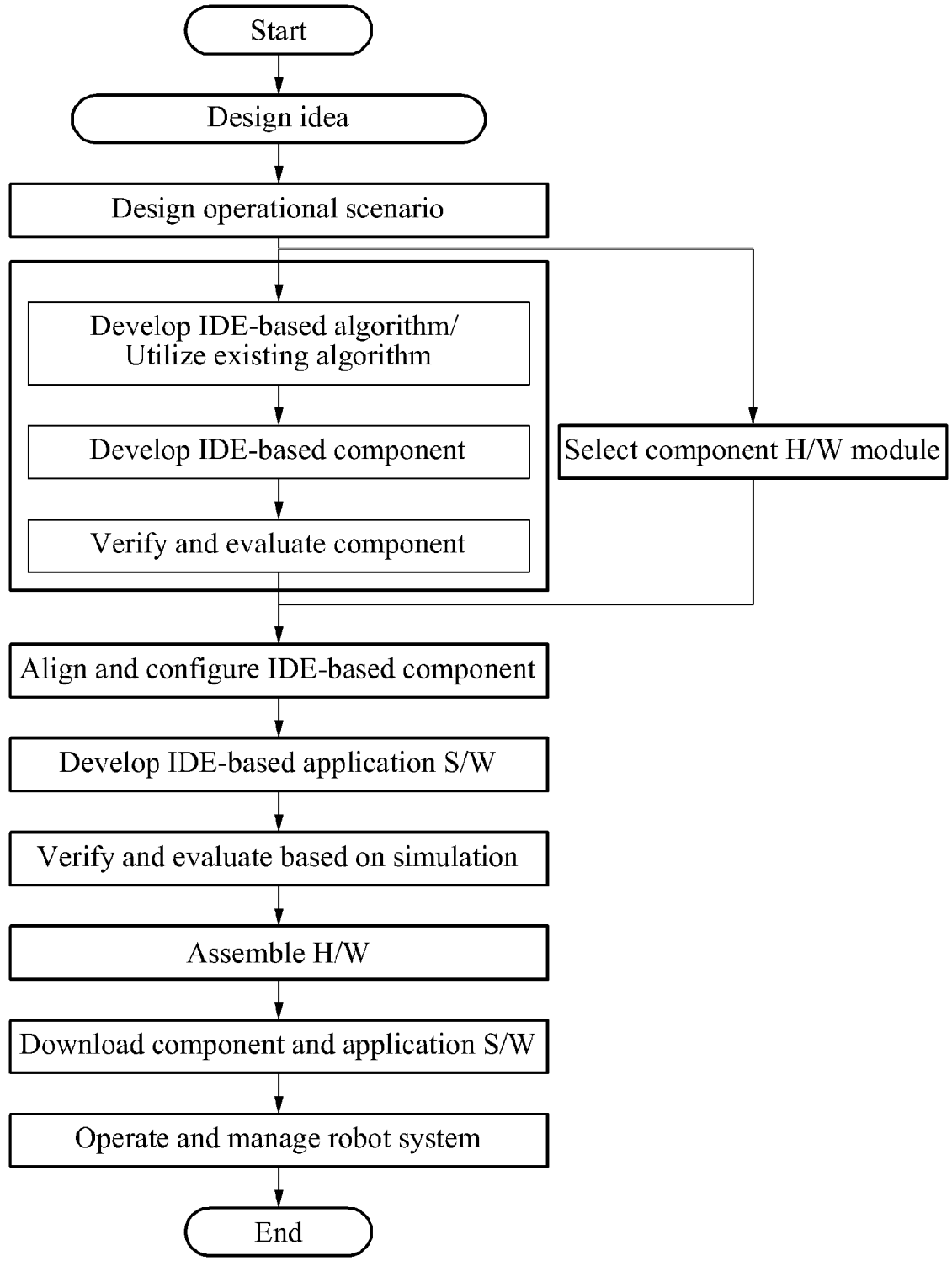
FIG. 7 is a flowchart illustrating a method of developing a robot system based on a component and content for a robot system according to an embodiment of the present invention.

FIG. 7 is a flowchart illustrating a method of developing a robot system based on a component and content for a robot system according to an embodiment of the present invention.

A recent intelligent robot system may correspond to a module-based system, which may be used to perform a task requested by a user, and the like, by developing an individual component and application content to be used in a robot system, verifying the developed component and application content based on predetermined evaluation items, storing the verified component and application content in a server or a robot apparatus, and combining the component and application content with another component depending on applications.

A process of developing a component may be performed as follows.

An operational scenario of a robot to perform a requested task may be designed.

For example, operational scenarios according to requested tasks may include operations as follows.

A robot may basically repeating an action of moving in a straight line for 1 meter (m) and making a 90 degree turn.

The robot may verify whether an obstacle is present through a laser scanner, and may stop to talk when an obstacle is found.

The robot may talk and play music when "0" is pressed on a keyboard.

The robot may restart the movement for the remaining distance when "1" is pressed on the keyboard.

The robot may stop when a direction is changed by a predetermined level due to an external influence while moving in a straight line.

The robot may display contents included in a universal serial bus (USB) camera on a screen.

An algorithm for designing components, application profiles, and the like that are requested based on the designed operational scenario may be developed.

For example, when a navigation operation is to be performed, requested components may include a wheel component, a laser sensor component, a camera component, a voice recognition component, a voice synthesis component, an execution component, a keyboard component, and the like.

Each of the components may be designed based on the designed algorithm. A design of a component may include a hardware component design and a software component design.

Descriptions about components have been provided with reference to FIGS. 2 and 3 and thus, duplicated descriptions will be omitted for conciseness.

Upon completion of component design, whether the developed component is suitable for an environment of the intelligent robot system may be verified.

Items for the verification may include component unit verification/test, state verification, and service port verification.

A most basic unit constituting a component of a robot may correspond to component internal functions. Each component of the robot may include an essential function required to be provided to execute a component function, in a form of an internal function. The internal function may correspond to the most basic element constituting the component, which may be subject to a test at a level of unit verification.

The unit verification may refer to finding a defect in a target to be tested, that is, software generated by segmenting the target to be tested into minimum units for a test, for example, a module, a program, an object, a class, and the like, and verifying a function of the software. A determination table testing method may refer to a method of deriving a determination table including input conditions, conditions or situations causing operations, and expected results of each corresponding combination by analyzing specifications about system requirements, and identifying conditions and operations of a system, and generating a test case based on the derived determination table.

The service port verification may refer to performing a test on a callback function of a component generated through a combination of internal functions of components. The callback function may perform an operation of interworking between an interface between components and other portions. Accordingly, the callback function may be subject to a test for a service port, that is, the interface between the components. The service port verification may be performed after the unit verification, and while an interaction between component units is tested.

The service port verification may be performed by the method of deriving a determination table including input conditions, conditions or situations causing operations, and expected results of each corresponding combination by analyzing specifications about system requirements, and identifying conditions and operations of a system, and generating a test case based on the derived determination table.

The state verification may regard a component as a target to be tested. Although a robot software component may correspond to a single component constituting a robot, the component may correspond to a single system representing a hardware device or an algorithm. Accordingly, the component may be regarded as a system, and a component test may be performed on the component. The robot software component may test a component state transition corresponding to an essential requirement for an operation of each component, through state transition testing.

White-box testing may be performed to test a possible memory leak, an execution rate, and a central processing unit (CPU) occupancy rate when the robot software component is executed. The white-box testing may refer to a method of testing a program structure by inserting a test code in a program code.

In the state verification, system requirements associated with an overall operation of the system may be tested based on requirement specifications, system operation specification of other business levels, a target to be tested, for example, interaction with an operating system (OS) and a system resource, and the like. Also, the state verification may represent, using a state transition diagram, an image reflecting a current state or past history of the system, and an aspect to be different depending on the state transition. A relationship between system states, that is, transition between states, an event and input value that may change the state, operations resulting from a change in state may be tested, using the state transition diagram.

The robot software component may be tested by the process and method described above.

In conjunction with the process of developing the component, a requested, suitable hardware component may be selected based on the operational scenario.

The selected hardware component and software component may be aligned based on the operational scenario, or a process of reconfiguring components already included in the robot may be performed.

Application software may be developed to perform the task using the designed component, or according to a separate process, and the developed application software may be verified and evaluated based on a simulation.

Through the aforementioned process, a software component may be developed, a robot apparatus may be configured by assembling selected hardware, a designed software component and an application program may be downloaded to the robot apparatus through an interface, and a task may be performed by operating the robot apparatus. When a manufactured or commercialized robot is present, the operation of assembling hardware (H/W) may be omitted.

Figure 8:
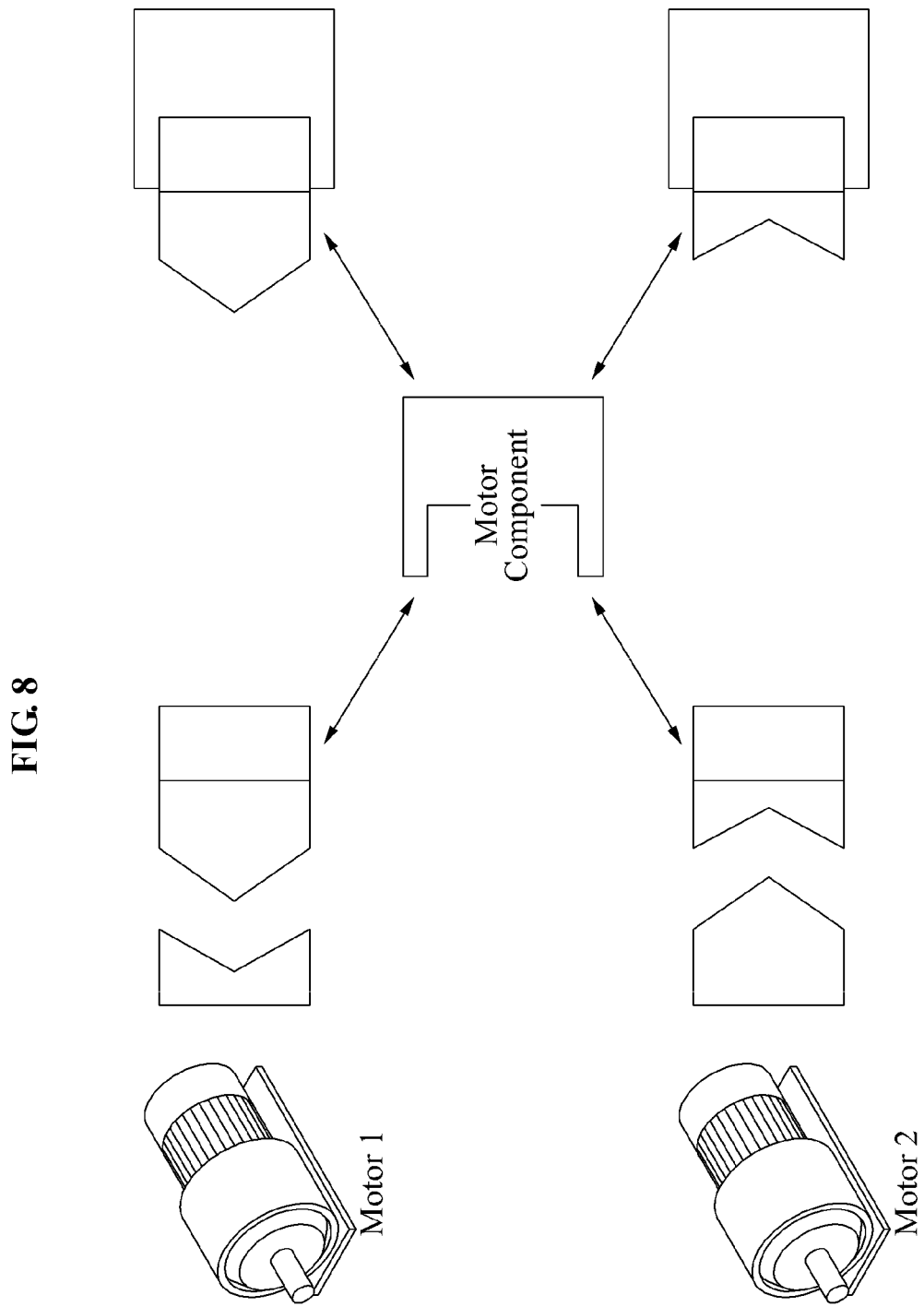
FIG. 8 is a diagram illustrating examples of using various motors according to an example embodiment of the present invention.

FIG. 8 is a diagram illustrating examples of using various motors according to an example embodiment of the present invention.

An execution program to control hardware and an component setting file which is a set of parameters associated with a characteristic of the hardware may be used to execute a hardware component included in a robot.

According to a conventional art, when a software component to execute hardware is designed, an execution program and environment settings may be designed simultaneously. Accordingly, the conventional art may have an advantage in that the software component may be designed to be optimized to an environment in which the robot may be operated. However, the conventional art may have a problem in that the software component may need to be redesigned to be optimized to a changed environment when the environment in which the robot may be operated is changed, or when the software component is to be replaced with a hardware component that may perform the same function due to an error, and the like. In order to resolve such a problem, according to an embodiment of the present invention, a portion to control a motor may be distinguished from a portion to read and write data directly from/to hardware of the motor, whereby a component may be executed when only the portion to read and write the data directly from/to hardware of the motor is changed while the portion to control the motor remains. The portion to read and write the data directly from/to hardware of the motor may correspond to a type of driver portion for a component. A hardware driver may use data through the driver for a component. Accordingly, only a driver for a corresponding component may need to be changed in a motor, and a name of the corresponding driver may be included in a component setting file.

Figure 9:
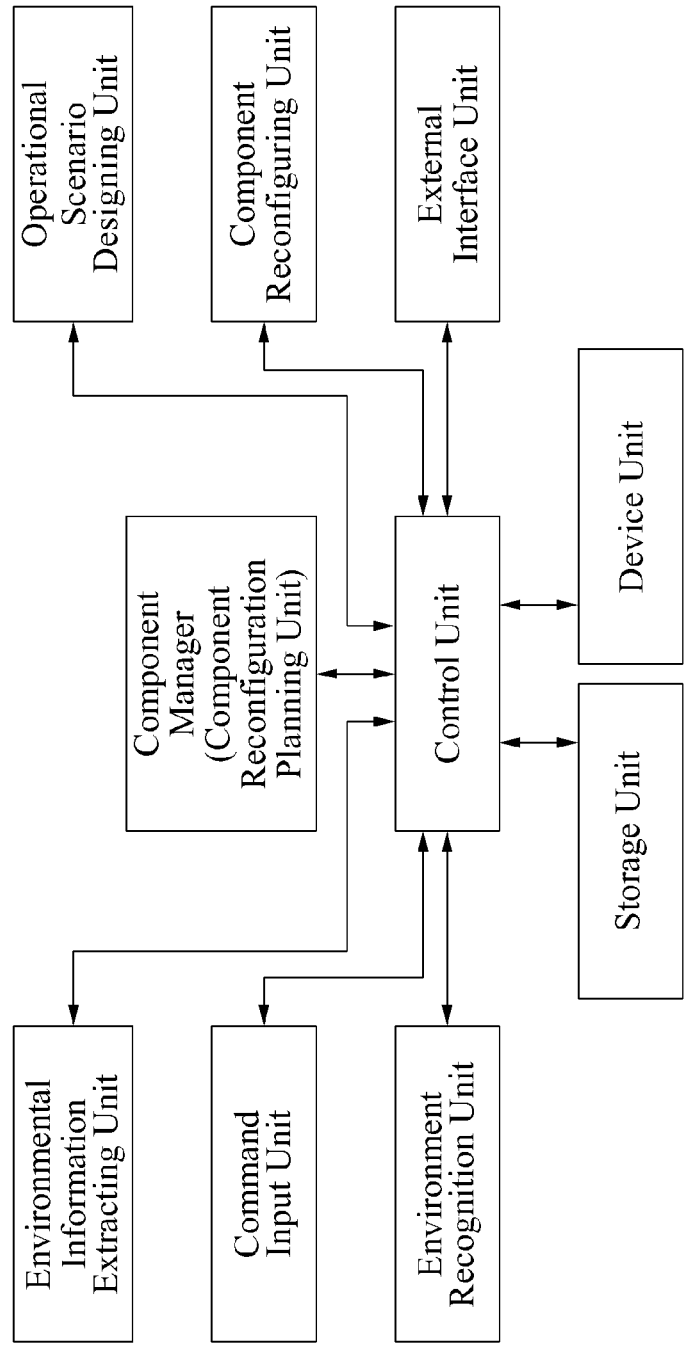
FIG. 9 is a diagram illustrating a configuration of a robot apparatus for dynamically reconfiguring an internal environment in a robot system according to an embodiment of the present invention.

FIG. 9 is a diagram illustrating a configuration of a robot apparatus for reconfiguring components to optimally perform a provided task or command according to an embodiment of the present invention. Also, FIG. 9 is a diagram to describe a method of dynamically reconfiguring an internal environment by designing an execution program and environment settings separately when designing a software component, and generating various combinations depending on a characteristic of hardware or an environment in which a robot may be operated, and to describe a method of dynamically reconfiguring robot software components. Various applications may be provided depending on combination of elements included in the robot apparatus.

Referring once more to FIG. 8, when a component of hardware optimized to an environment in which the robot is operated, for example, a motor, is present, it may be assumed that Motor 1 or Motor 2 may be used to configure a motor component.

When Motor 1 is used, the motor component may be reconfigured by reading components suitable for Motor 1, for example, Execution Program 1 (not shown) and Component Setting File 1 (not shown), from a storage unit included in the robot. When Motor 2 is used, the motor component may be reconfigured by reading components suitable for Motor 2, for example, Execution Program 2 (not shown) and Component Setting File 2 (not shown), from the storage unit.

However, when Execution Program 1 and Component Setting File 1 for Motor 1 are absent in the storage unit, Execution Program 1 and Component Setting File 1 may be requested from a server, through a communication unit, that is, an external interface unit.

The server may search for Execution Program 1 and Component Setting File 1 that are requested from the robot, and may transmit Execution Program 1 and Component Setting File 1 to the robot when Execution Program 1 and Component Setting File 1 are found.

The robot may reconfigure Execution Program 1 and Component Setting File 1 that are received from the server to be the software component of Motor 1, and may store Execution Program 1 and Component Setting File 1 in the storage unit.

A case in which Execution Program 1 and Component Setting File 1 are absent in the server as a result of the searching will be described in detail with reference to FIG. 10 and thus, detailed descriptions will be omitted for conciseness.

As described above, an intelligent robot system may correspond to a system operated based on components. Although settings for the robot are changed, separate re-assembly of the robot or redesign of the components may need to be avoided.

Also, the intelligent robot system may need to dynamically change the settings for the robot in response to a changed environment, by dynamically recognizing a change in the environment in which the robot is operated.

To realize the foregoing, the intelligent robot system may need to dynamically recognize the changed environment, and dynamical reconfigure the components in response to the change in the environment.

As described above, the intelligent robot system may analyze a provided task or command, predict execution of the components included in a robot apparatus, derive an optimal configuration of the components to optimally perform the input task or command, and verify whether an execution program or a component setting file used to execute the components is using a resource of the current robot to the maximum or whether the execution program or the component setting file is applicable to the current robot system, thereby reconstructing the components of the robot apparatus.

The provided task or command may correspond to an application program that may be input to the robot.

FIG. 9 illustrates a configuration of a robot that may dynamically reconfigure a hardware component and a software component constituting the robot so that performance of the robot may be optimized by dynamically recognizing a change in an environment, adapting to the change in the environment recognized, or performing a provided task or command through an analysis of the provided task or command.

That is, in order to dynamically reconfigure the components constituting the robot, a command input unit may receive an input of a command or task to be performed by the robot.

An environment recognition unit may dynamically recognize a change in an environment. The environment recognition unit may recognize a change in an external environment and a change in an internal environment of the robot.

The change in the external environment may be recognized by a sensor included in the robot, or by a component to recognize a location, for example, an overall map component, and the like. The change in the internal environment may be recognized by a component manager to monitor an operational state of the hardware component or the software component included in the robot.

The change in the external environment may include a case in which the robot being operated indoors may move to an outdoor area, a case in which an environment of an obstacle, and the like that may be a barrier when the robot performs the task may be changed, and a climatic change, for example, weather, and the like.

The change in the internal environment may include an error occurring in the hardware component or software component included in the robot.

When the environment is changed, the robot may reconfigure the components of the robot to optimally perform the provided task. In this instance, the robot may parameterize an extent of the change in the environment to measure the change in the environment.

A parameter with respect to the change in the external environment may include, for example, a value indicating a number of objects moving around the robot, a value indicating a number of obstacles on a moving route of the robot, or a value measured by a sensor, for example, temperature, humidity, brightness, or the like. A parameter with respect to the change in the internal environment may include a value indicating whether the software component or hardware component included in the robot apparatus is normally operated, or a value indicating whether an available capacity of a battery is maintained at a predetermined level.

The robot may reconfigure the components of the robot to optimally perform the provided task, based on the change in the environment recognized. In this instance, the robot may determine a hardware component and a software component to be used. The software component may correspond to an execution program or a component setting file to execute the hardware component, or a software module unrelated to the hardware component.

When the hardware component and the software component to be used are determined, the robot may determine a plurality of software components, that is, execution programs or component setting files, or software modules, to execute hardware. The plurality of software components determined may be connected to the hardware component to enable the robot to perform the provided task or command, and may used be as execution software.

A method of determining the component in response to the changed environment may include extracting information to be used to recognize the changed environment, from information that is input from the sensor, and the like.

The extracted information about the change in the environment may be used to select a component to be used to optimally perform an operational scenario to perform the provided task after the operational scenario for the provided task or command is designed.

In this instance, the determined component may be stored in a storage unit included in the robot apparatus, or may be absent in the storage unit.

When the determined component is stored in the storage unit of the robot apparatus, a control unit may perform the task input to the robot, by reading an execution program and a component setting file of corresponding hardware from the storage unit, reconfiguring components using the component manager, downloading the reconfigured components to the hardware component, and executing the hardware based on an operational scenario.

Conversely, when the determined component is absent in the storage unit of the robot apparatus, the control unit may request a server to transmit the corresponding execution and component setting file, through an external interface unit.

The server may verify whether the requested execution program and component setting file are stored in a component registry included in the server, and may transmit the requested execution program and component setting file to the robot through the external interface unit when the requested execution program and component setting file are stored in the server.

The robot may store, in the storage unit, the execution program and component setting file received from the server, download the execution program and component setting file to the hardware, and perform the task input to the robot by executing the hardware based on the operational scenario.

However, when the corresponding execution program and component setting file are absent in the component registry of the server, the robot may temporarily take an action to perform the task. In this instance, the robot may execute the hardware using a basic execution program and component setting file, instead of the optimized execution program or component setting file, and may determine whether to use resources of the server to manage a situation arising while the robot is operated.

In this instance, the resources of the server may be used because a resource included in the robot may be limited, and may not be enough to manage the situation in real time. Accordingly, the situation may be processed by the server having an even greater number of resources. The robot may receive an input of a process command executed in the server, and may follow the process command.

For this, the robot may transmit, to the server, a current state and a command to be performed, that is, the task. The server may generate a command to be processed by the robot in the current state, based on the received current state and the command to be performed, and may transmit the generated command to the robot. The command to be performed may include an algorithm for executing the hardware component and the software component.

The robot may perform the input command, that is, the task by executing the hardware and the software based on the received process command.

The process command transmitted from the server may be stored in the storage unit. The process command may include internal functions corresponding to minimum units constituting the software component, or a combination of the internal functions. A greater number of internal functions than a predetermined number may be stored in the storage unit. All internal functions constituting the execution program or the component setting file may be stored. The internal functions may be converted into new execution programs or component setting files, and may be stored in the storage unit to be used for a future process of an identical command or task.

As described with reference to FIG. 7, an operational scenario of the robot may be designed, and components to perform the operational scenario may be selected, based on the input task or command.

The selected components may be reconfigured optimally. Whether the selected components are applicable to current settings of the corresponding robot may be verified. Various items for the verification may be determined depending on a configuration of the robot. Essential items may include an OS of the robot, a CPU type, and a program format.

The control unit may determine, through the component manager, whether the components stored in the storage unit are suitable for the current settings of the corresponding robot, based on criteria determined to be the items for the verification, and may download a suitable component to the hardware component when the suitable component is found. The components found in the storage unit may correspond to an execution program or a component setting file corresponding to the hardware component.

However, when the corresponding components are absent in the storage unit of the robot, the control unit may request the server to transmit the corresponding execution program and the component setting file, through the external interface unit.

Figure 10:
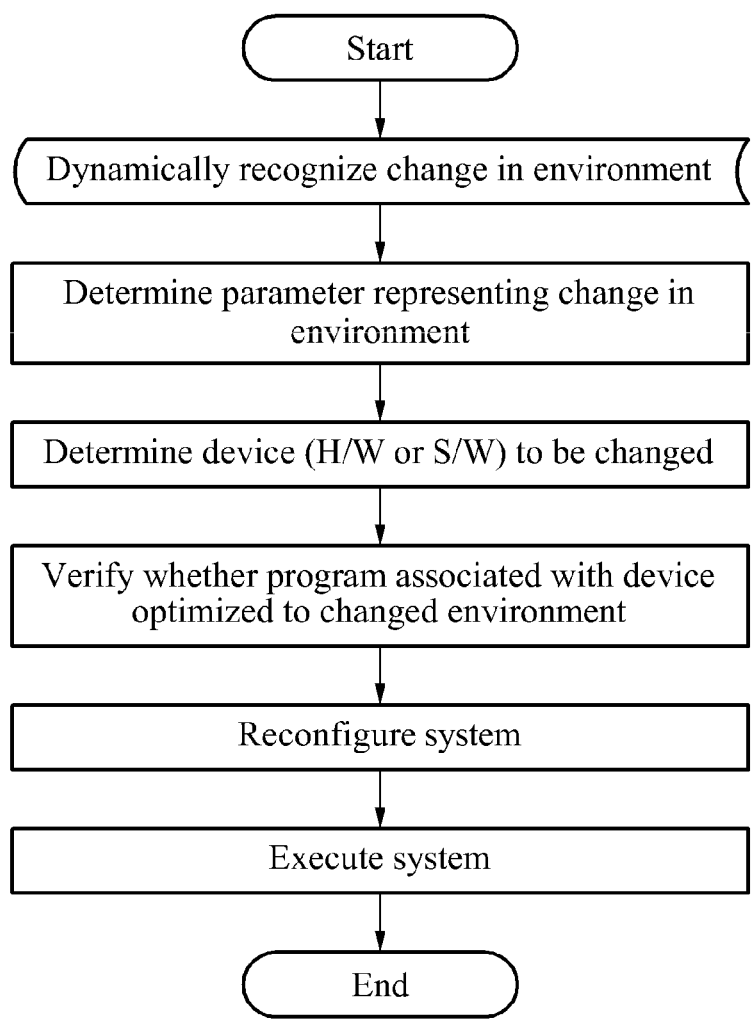
FIG. 10 is a flowchart illustrating a method of controlling a robot apparatus for dynamically reconfiguring an internal environment in a robot system according to an embodiment of the present invention.

FIG. 10 is a flowchart illustrating a method of controlling a robot apparatus for dynamically reconfiguring an internal environment in a robot system according to an embodiment of the present invention.

As described with reference to FIG. 9, the present invention relates to a method of dynamically recognizing a change in an external or internal environment, and dynamically reconfiguring components of a robot to be optimized in response to the change in the environment recognized.

A change in the external environment or the internal environment occurring after the robot is operated may be dynamically recognized.

The change in the environment recognized may be converted to a parameter representing a change in an environment, selectively.

A component to be reconfigured may be determined by determining a component optimal to perform a task, based on the parameter. The component to be reconfigured may correspond to a hardware component or a software component.

When the component to be reconfigured, in particular, the hardware component, is determined, whether an execution program and a component setting file for the corresponding hardware component are present in the robot may be verified. When the execution program and the component setting file are present in the robot, the execution program and the component setting file may be read from a storage unit to reconfigure the to hardware component, and the task may be performed.

A case in which the execution program and the component setting file for the corresponding hardware component are absent in the robot has been described with reference to FIG. 9 and thus, duplicated descriptions will be omitted for conciseness.

Referring once more to FIG. 8, an operational scenario to execute the hardware component and the software component based on the provided task may be designed, and each component may be executed optimally based on the designed scenario.

In a conventional robot system, each component may be executed in a predesigned manner, without considering an optimal execution of each component based on the designed scenario.

However, the conventional robot system may fail to use a provided resource of the robot efficiently and effectively, in such the foregoing manner.

That is, by separately designing an execution program and environmental settings when designing a software component, various combinations may be achievable depending on an environment in which the robot may be operated or a characteristic of hardware.

That is, when a component of hardware optimized to an environment in which the robot is operated, for example, a motor, is present, it may be assumed that Motor 1 or Motor 2 may be used to configure a motor component.

When Motor 1 is used, the motor component may be reconfigured by reading components suitable for Motor 1, for example, Execution Program 1 (not shown) and Component Setting File 1 (not shown), from a storage unit included in the robot. When Motor 2 is used, the motor component may be reconfigured by reading components suitable for Motor 2, for example, Execution Program 2 (not shown) and Component Setting File 2 (not shown), from the storage unit.

However, when Execution Program 1 and Component Setting File 1 for Motor 1 are absent in the storage unit, Execution Program 1 and Component Setting File 1 may be requested from a server, through a communication unit, that is, an external interface unit.

Whether Execution Program 1 and Component Setting File 1 for Motor 1 are present in the storage unit may be determined based on whether Execution Program 1 and Component Setting File 1 are compatible with a current configuration of the robot. That is, an environment of the robot at a time when Execution Program 1 and Component Setting File 1 for Motor 1 are designed may be different from a current environment to which Execution Program 1 and Component Setting File 1 for Motor 1 are to be applied. In this instance, Execution Program 1 and Component Setting File 1 for Motor 1 may be unsuitable for the current environment of the robot.

The environment of the robot may include an OS, a CPU type, a program format, and the like. In particular, an initial environment of the robot may correspond to a system operated using Windows, an Intel CPU, and a program of an executable (exe) file format. When the initial environment of the robot may be changed to a system operated using a Linux OS, an Advanced Micro Devices (AMD) CPU, and a program of a dynamic linking library (dll) format, due to an intermediate change in the system, an execution program, a component setting file, and the like that are developed with respect to the initial environment may be inapplicable to a current robot system. Although the execution program, the component setting file, and the like that are developed with respect to the initial environment are applicable, the current robot system may fail to have an optimized performance.

An optimized execution program and component setting file may be need in order to perform the provided task optimally. When the optimized execution program and component setting file are absent in the robot apparatus, the optimized execution program and component setting file may be downloaded from a server, and may be set in the robot apparatus.

That is, the robot may request, from the server, the corresponding execution program and component setting file when the execution program and component setting file are absent in the robot. The server may transmit, to the robot, the execution program and component setting file requested by the robot, for example, Execution Program 1 and Component Setting File 1, when Execution Program 1 and Component Setting File 1 are found in an internal registry of the server.

The robot may reconfigure received Execution Program 1 and Component Setting File 1 to be the software component, and may store Execution Program 1 and Component Setting File 1 in the storage unit.

A case in which Execution Program 1 and Component Setting File 1 are absent as a result of searching for Execution Program 1 and Component Setting File 1 in the server will be described in detail with reference to FIG. 11 and thus, duplicated descriptions will be omitted for conciseness.

Figure 11:
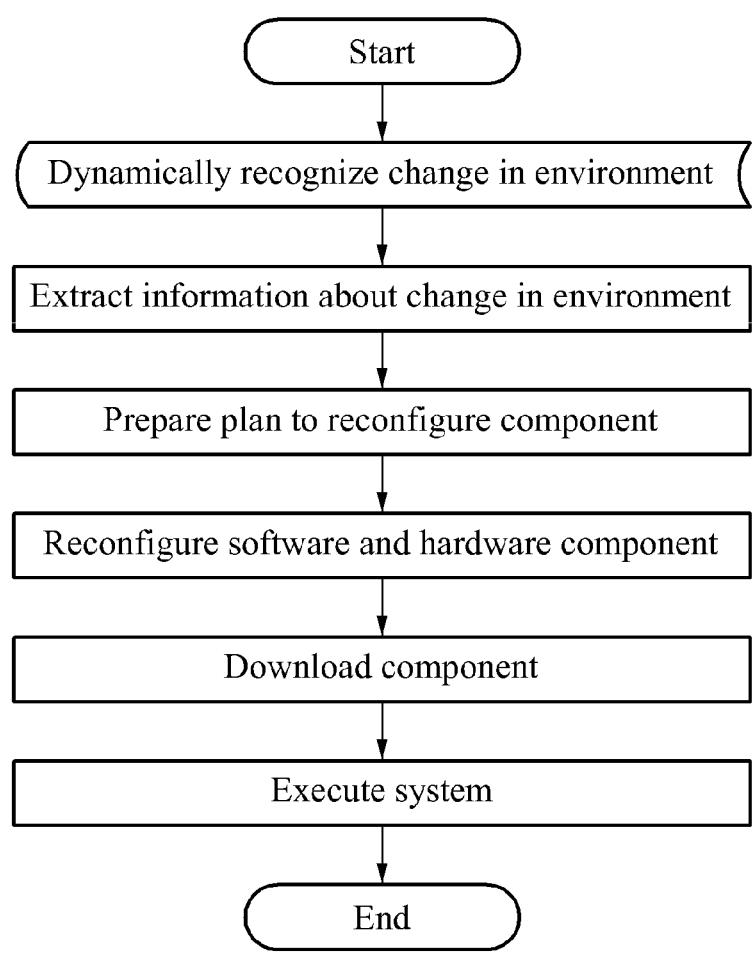
FIG. 11 is a flowchart illustrating a method of controlling a robot apparatus to dynamically reconfigure a software component constituting the robot in response to a changed environment in a robot system according to an embodiment of the present invention.

FIG. 11 is a flowchart illustrating a method of controlling a robot apparatus to dynamically reconfigure a software component constituting the robot in response to a changed environment in a robot system according to an embodiment of the present invention.

The present invention relates to a method of dynamically recognizing a change in an external or internal environment of a robot, and dynamically reconfiguring an internal component of a robot, that is, a software component in response to the change in the environment according to a hardware execution plan to execute a provided task or command.

A change in the external environment or the internal environment occurring after the robot is operated may be dynamically recognized.

The change in the environment may correspond to a change in a value indicating a number of objects moving around the robot, a change in a value indicating a number of obstacles on a moving route of the robot, or a change in a value measured by a sensor, for example, temperature, humidity, brightness, or the like, and may also correspond to a change in a value indicating whether the software component or hardware component included in the robot apparatus is normally operated, or a change in a value indicating whether an available capacity of a battery is maintained at a predetermined level.

The hardware execution plan to optimally perform the provided task or command may be prepared based on information about the change in the environment, and a plan to reconfigure the software component may be prepared based on the hardware execution plan.

The software component may be reconfigured by extracting the software component from a storage unit included in the robot, based on the plan to reconfigure the software, and the reconfigured software component may be downloaded to the hardware component.

The robot may be operated based on an operation scenario for hardware that may be designed based on the provided task or command.

The software component may correspond to an execution program or a component setting file for the hardware component.

Figure 12:
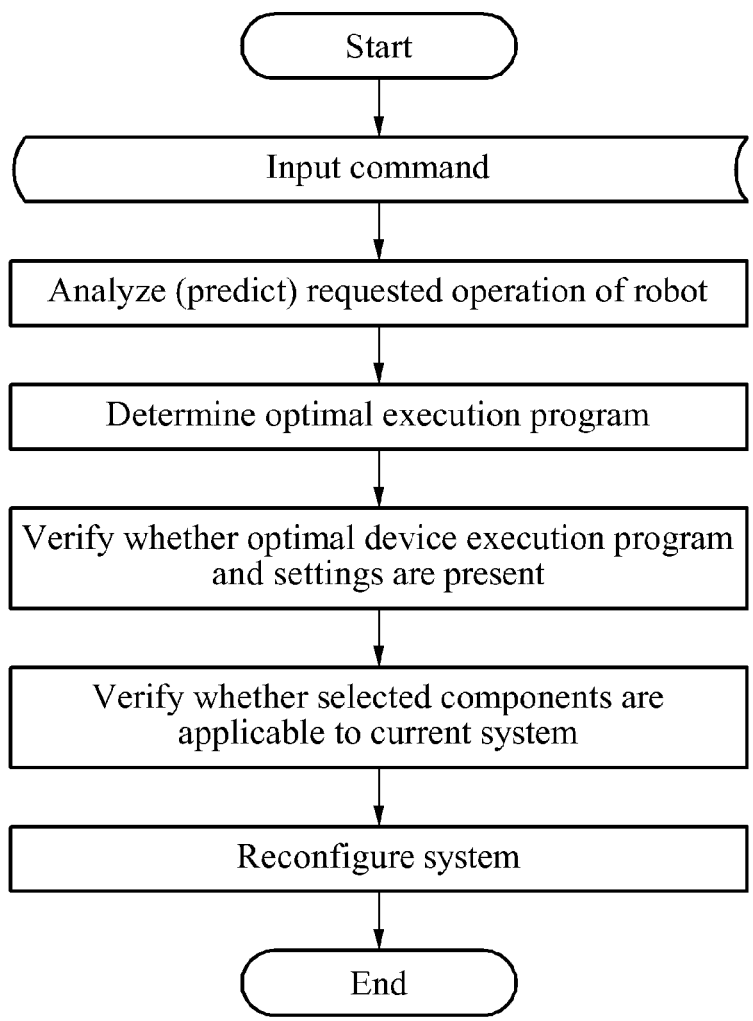
FIG. 12 is a flowchart illustrating a method of controlling a robot apparatus for dynamically reconfiguring an internal environment in a robot system according to another embodiment of the present invention.

FIG. 12 is a flowchart illustrating a method of controlling a robot apparatus for dynamically reconfiguring a component to optimally perform a provided task or command according to another embodiment of the present invention.

A robot may be operated, and a command or task corresponding to an application program that is to be performed by the robot may be input by a user or a program.

By analyzing the input command or task, components constituting the robot may be dynamically determined so that a performance of the robot may be optimized to perform the provided task or command, whereby the robot may optimally perform the input task or command, or may be operated at highest effectiveness and efficiency.

The determined components may be reconfigured optimally after verifying whether the determined components are applicable to current settings of the corresponding robot.

Various items for the verification may be determined depending on a configuration of the robot. Essential items may include a current OS of the robot, a CPU type, and a program format.

A control unit may determine, through a component manager, whether the components stored in the storage unit are suitable for the current settings of the corresponding robot, based on criteria determined to be the items for the verification, and may download a suitable component to the hardware component when the suitable component is found. The components found in the storage unit may correspond to an execution program or a component setting file corresponding to the hardware component.

However, when the corresponding components is absent in the storage unit of the robot, the control unit may request a server to transmit the corresponding execution program and component setting file, through an external interface unit.

The server may verify whether the requested execution program and component setting file are present in a component registry included in the server, and may transmit the requested execution program and component setting file to the robot through the external interface unit when the requested execution program and component setting file are stored in the server.

The robot may store, in the storage unit, the execution program and component setting file received from the server, download the execution program and component setting file to the hardware, and perform the task input to the robot by executing the hardware based on the operational scenario.

A case in which the requested execution program and component setting file for the corresponding hardware component are absent in the server has been described in detail with reference to FIG. 9 and thus, duplicated descriptions will be omitted for conciseness.

The above-described exemplary embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM discs and DVDs; magneto-optical media such as floptical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A method of dynamically reconfiguring an environment of a robot apparatus utilizing a control unit, the method comprising:
   dynamically recognizing during operation of the robot apparatus, with the control unit, a change in an internal environment of the robot apparatus in which one or more components in the robot are changed, or an external environment in which the robot is installed or operated;
   determining during operation of the robot apparatus, with the control unit, an internal component to be changed in the robot apparatus, based on the change in the internal or external environment recognized; and
   verifying during operation of the robot apparatus, with the control unit, whether a component setting file and a component execution program optimally corresponding to the internal component to be changed are present in the robot apparatus,
   wherein when the change is in the internal environment, the change in the internal environment of the robot apparatus comprises occurrences of a fault of the one or more components in the robot, and
   wherein when the change is in the external environment, a parameter with respect to the change in the external environment of the robot apparatus corresponds to a value indicating a number of objects moving around the robot apparatus, or a value indicating a number of obstacle on a moving route of the robot apparatus.

2. The method of claim 1, further comprising:
   converting the change in the internal or external environment recognized to a parameter.

3. The method of claim 2, wherein the determining comprises determining the internal component to be changed in the robot apparatus, based on the parameter.

4. The method of claim 1, further comprising:
   optimizing the internal component using a component setting file and a component execution program optimally corresponding to the internal component to be changed when the component setting file and the component execution program optimally corresponding to the internal component to be changed are present in the robot apparatus.

5. The method of claim 4, further comprising:
   operating the robot apparatus in a changed internal or external environment.

6. The method of claim 1, wherein the change comprises a change in the internal environment, and wherein a parameter with respect to the change in the internal environment of the robot apparatus corresponds to a value indicating whether a software component or a hardware component included in the robot apparatus is normally operated, or a value indicating whether an available capacity of a battery is maintained at a predetermined level.

7. The method of claim 1, wherein
   the internal component to be changed comprises at least one of a software component or a hardware component included in the robot apparatus,
   the software component comprises a component setting file and an execution program for the hardware component that is executed by the software component, and
   a power supplied to the hardware component is cut off when the hardware component is changed.

8. A robot system comprising:
   a service provider;
   a service registry; and
   a robot apparatus communicatively coupled to the service provider and service registry, the robot apparatus comprising a control unit, wherein the control unit is configured to execute a set of instructions to implement during operation of the robot apparatus:
      an environment recognition unit that dynamically recognizes a change in an internal environment of the robot apparatus in which one or more components in the robot are changed, or an external environment in which the robot is installed or operated;
      an environment information extracting unit that extracts information about the change in the internal or external environment received by the environment recognition unit to determine a component to be changed;
      a storage unit that stores a component setting file and a component execution
      program that is requested and verified by the control unit to determine if the component setting file and the component execution program correspond to the component to be changed;
      a component manager that configures basic setting between components of the robot apparatus and based on a request by the control unit;
      a command input unit that receives a command or task to be performed by the control unit; and
      a component reconfiguring unit that reconfigures components setting files and component execution programs stored in the storage unit,
   wherein when the change is in the internal environment, the change in the internal environment of the robot apparatus comprises occurrence of a fault of the one or more components in the robot, and
   wherein when the change is in the external environment, a parameter with respect to the change in the external environment of the robot apparatus corresponds to a value indicating a number of objects moving around the robot apparatus, or a value indicating a number of obstacles on a moving route of the robot apparatus.

9. The robot system of claim 8, wherein the control unit requests a server to transmit a corresponding component setting file and component execution program based on a determined component to be changed.

10. The robot system of claim 9, wherein the control unit transmits to the server a component setting file and a component execution program that is absent from the server and storage unit.

11. The robot system of claim 8, wherein the environment recognition unit recognizes a change in the internal or external environment of the robot apparatus while the robot apparatus is being operated.

12. The robot system of claim 8, wherein the environment recognition unit recognizes a change in the internal or external environment of the robot apparatus in response to a movement of the robot apparatus, or an internal fault.

13. The robot system of claim 8, further comprising an operational scenario unit implemented by the control unit to develop a component of the robot apparatus.

14. The robot system of claim 8, further comprising a device unit implemented by the control unit to receive information about a hardware device attached to the robot apparatus.

* * * * *